UNITED STATES PATENT OFFICE.

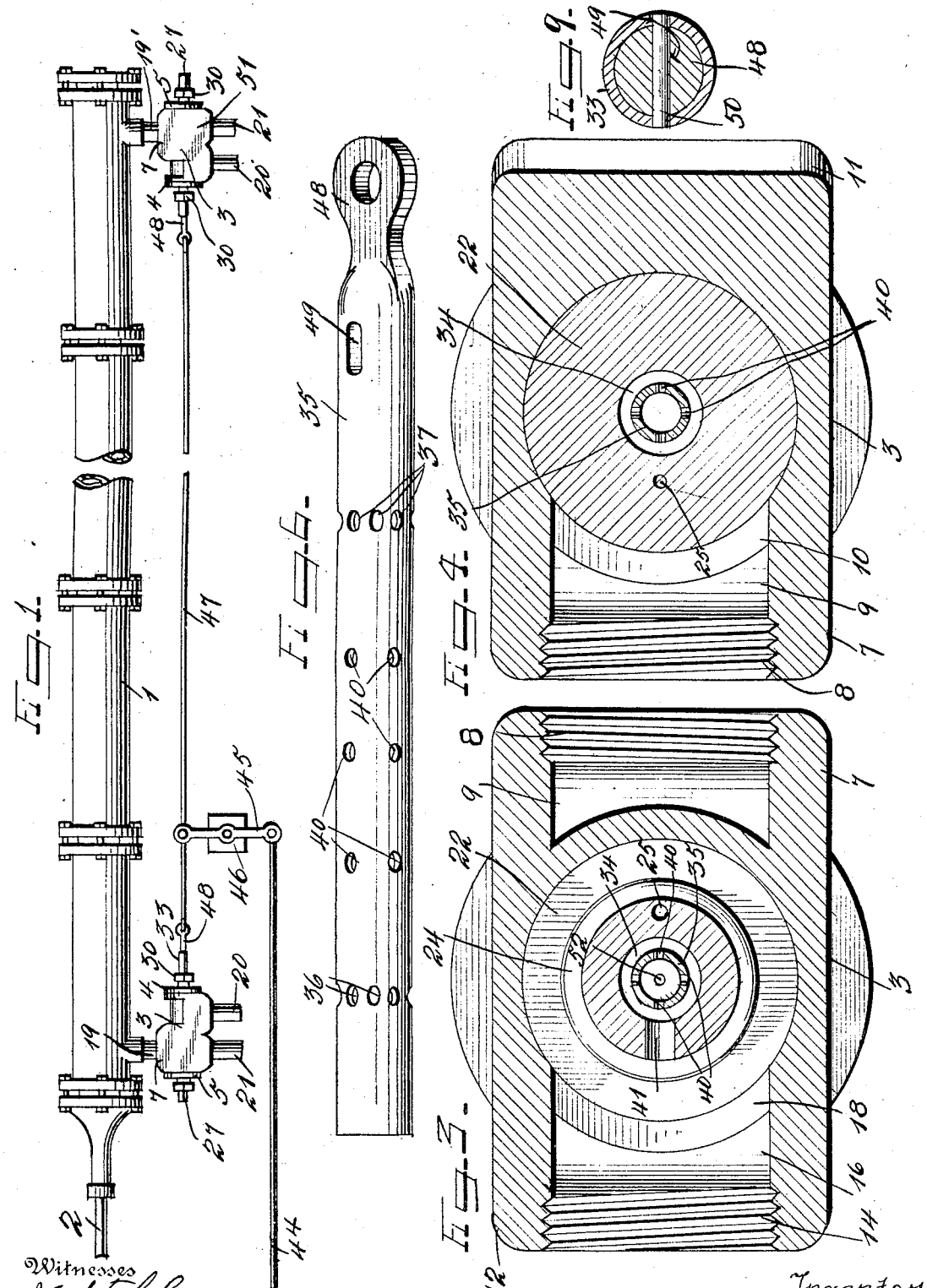

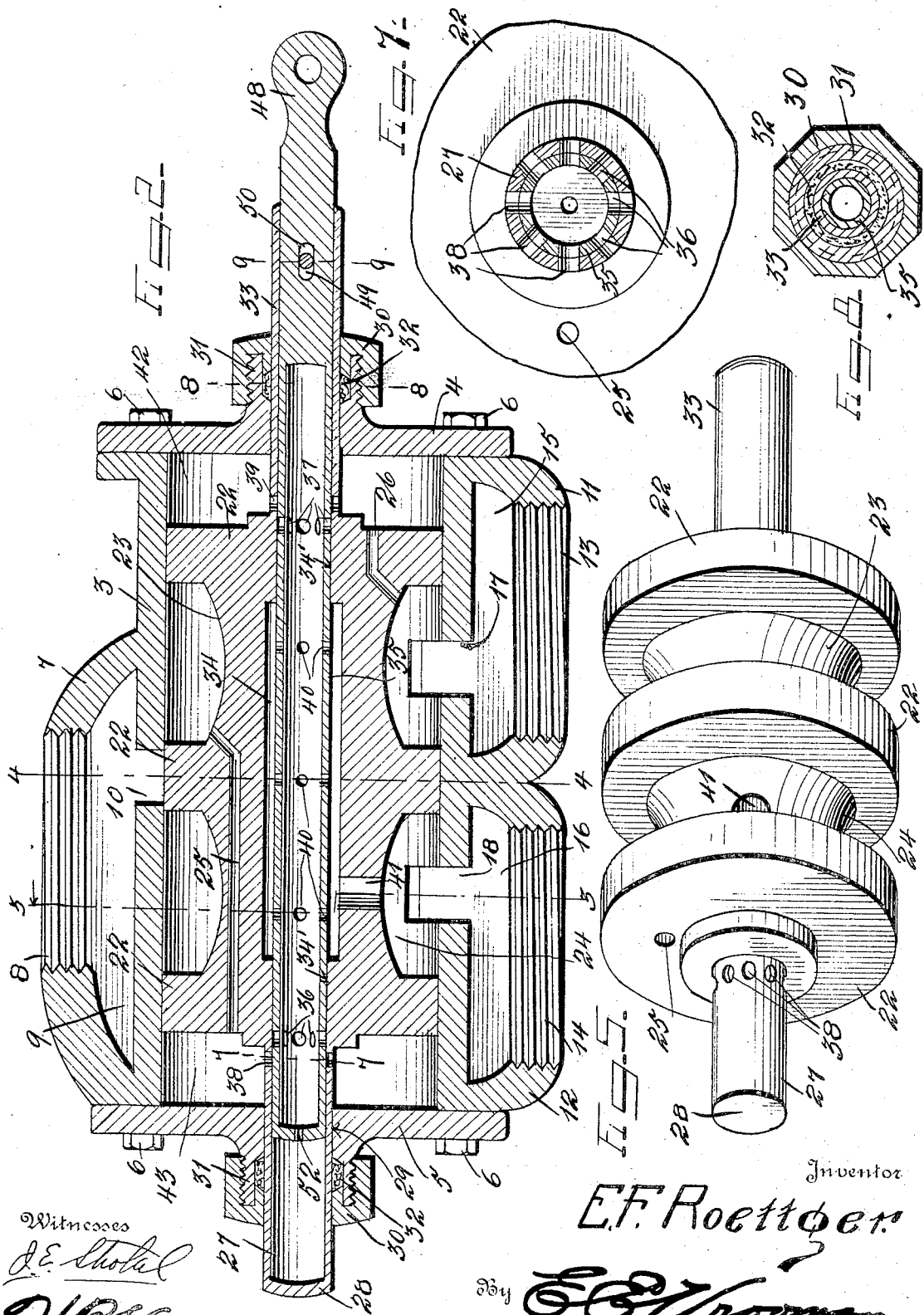

EDMUND F. ROETTGER, OF ROCHELLE, LOUISIANA.

STEAM-FEED VALVE.

1,119,640.   Specification of Letters Patent.   Patented Dec. 1, 1914.

Application filed May 21, 1914. Serial No. 840,069.

*To all whom it may concern:*

Be it known that I, EDMUND F. ROETTGER, a citizen of the United States of America, residing at Rochelle, in the parish of Grant and State of Louisiana, have invented certain new and useful Improvements in Steam-Feed Valves, of which the following is a specification, reference being had therein to the accompanying drawing.

This invention relates to a steam feed valve and has for its object the production of a device which is adapted to be provided with a simple and efficient means for allowing steam to be fed into a casing whereby a head carried therein may be easily shifted.

Another object of this invention is the production of a valve sleeve which is slidably mounted through a certain head so as to allow steam which is carried within the cylinder at each end of the head to be easily exhausted thereby causing the head to move in the desired direction.

This device is adapted to be used particularly in saw-mills where the carriage upon which the timbers are conveyed to and from the saw is operated by steam pressure, and this invention is adapted to be particularly used for the admission of steam at desired points into the elongated casing thereby driving the carriage in a desired direction.

With these and other objects in view, this invention consists in general of certain novel combinations and constructions and arrangements of parts as will be hereinafter fully described and claimed.

In the accompanying drawing:—Figure 1 is a side elevation of a pair of steam feed-valves showing the same connected to the elongated casing which carries the steam for driving the saw carriage. Fig. 2 is a central longitudinal section taken through one of the steam feed-valves. Fig. 3 is a section taken on the line 3—3 of Fig. 2, looking in the direction of the arrow. Fig. 4 is a section taken on the line 4—4 of Fig. 2. Fig. 5 is a detailed perspective view of the head. Fig. 6 is a detailed perspective view of the valve sleeve. Fig. 7 is a section taken on the line 7—7 of Fig. 2 showing the exhaust openings registering. Fig. 8 is a section taken on the line 8—8 of Fig. 2. Fig. 9 is a section taken on the line 9—9 of Fig. 2.

By referring to the accompanying drawings by numerals 1 designates the elongated tubular casing which is formed of a plurality of sections thereby allowing the same to be formed to constitute any desired length. This tubular casing 1 is adapted to be provided with a stem 2 which may be provided at its inner end with any form of a cylinder head, such head not being deemed necessary to be herein disclosed. This stem is adapted to be connected at its outer end to a carriage ordinarily used in saw-mills for the purpose of moving the carriage in a desired direction when it is desired to convey logs or timbers to and from the saw. In order to reciprocate this stem it is necessary to provide a simple and efficient means for supplying either end portion of the casing 1 with steam pressure and it is for the attainment of this end that this invention is particularly used.

The steam feed-valve comprises a cylindrical casing 3 having heads 4 and 5 secured to its end portions by means of the bolts or other securing members 6. The upper side portion of the cylinder 3 is provided with an integral neck 7 having a threaded opening 8. This neck 7 forms a chamber 9 which communicates with the interior of the cylinder 3 by means of the port 10. The lower side portion of the cylinder 3 is also provided with integral necks 11 and 12 which have threaded openings 13 and 14 respectively and these necks 11 and 12 also form chambers 15 and 16. The lower portion of the cylinder 3 is also provided with a port 17 which communicates with the chamber 15 and with an exhaust port 18 communicating with the chamber 16. The neck 7 is adapted to receive a pipe 19. This pipe engages the threaded portion 8 so as to communicate with the chamber 9. It is through this pipe that the steam within the cylinder may be conducted into one end of the casing 1 for driving the stem 2 in a desired direction. The neck 11 may allow the feed-pipe 20 to engage a threaded portion 13. This feed-pipe is adapted to communicate with the boiler so as to allow the steam which passes therethrough to be conducted under the same pressure as the steam within the boiler. An exhaust pipe 21 is threaded into engagement with the threaded portion 14 of the neck 12 so as to relieve the cylinder 3 of a portion of the steam carried thereby when so desired.

In order to control the steam which is conducted to the cylinder 3 by means of the feed-pipe 20 there is provided a reciprocal head positioned within the cylinder 3 and a valve sleeve slidably positioned within the reciprocal head for opening and closing certain openings whereby the passage of the steam may be easily controlled by shifting the reciprocal head.

By referring particularly to Figs. 2 and 5 the construction of this reciprocal head will be clearly disclosed. This head comprises a body 22 having formed therein a pair of semi-annular grooves 23 and 24. These grooves 23 and 24 constitute chambers into which the steam may pass when it is so desired. By referring to Fig. 2 it will be seen that the groove constituting the chamber 23 communicates with the end of the head by means of the passage 25. It will further be noted that the groove 23 also communicates with the opposite end of the head 22 by means of a short passage 26. This head 22 is provided upon one end with an integral tube 27 having a closed end 28. This tube 27 passes through the opening 29 formed in the head 5 of the cylinder 3 and also through the cap 30 which engages the threaded portion 31. By means of the threaded portion 31 and the cap 30 the packing 32 will be held in position for preventing the steam from passing out from the cylinder around this tube 28. The opposite end of the head 22 is also provided with a tube 33 which is formed substantially similar to the tube 27 with the exception that the outer end thereof is open. The head 4 is also provided with a threaded portion 31, cap 30, and packing 32 for accomplishing the same functions as those elements do upon the cap 5. These tubes 27 and 33 communicate with an enlarged exhaust bore 34 by means of the reduced bores 35 formed in the reciprocal head 22. The valve sleeve 35 is hollow and it is provided with exhaust openings 36 adjacent one end and 37 adjacent the opposite end thereof. The exhaust openings 36 are adapted to register with exhaust openings 38 formed in the tube 27 while the exhaust openings 37 are adapted to register with the exhaust openings 39 formed in the tube 33. This valve sleeve is also provided with a plurality of secondary exhaust openings 40 which are formed so as to be positioned within the exhaust bore 34 formed in the head 22. This head 22 is also provided with an exhaust port 41 forming a conduit between the exhaust bore 34 and the exhaust port 18. When this device is in use steam is admitted to the cylinder by means of the feed-pipe 20. The steam will then pass through the port 17 into the groove 23. Some of the steam will then pass through the short passage 26 and the space 42 between the cap or head 4 and the cylinder 3 and the end of the reciprocal head 22. The steam will also pass around the groove 23 and then through the passage 25 and the space 43 formed between the cap or head 5 and the cylinder 3 and the adjacent end of the reciprocal head 22. As the steam is admitted at boiler pressure and is contained within each of the spaces 42 and 43 the reciprocating head will remain stationary. If, however, it is desired to admit the steam to the casing 1 by means of the pipe 19, the valve sleeve 35 may be moved inwardly relative to the cylinder 3. By moving the sleeve a short distance the exhaust openings 36 will register with the openings 38 formed in the tube 27 thereby allowing the steam within the space 43 to pass into the interior of the valve sleeve 35. The steam will then pass from the valve sleeve 35 through the openings 40 and into the exhaust bore 34. The steam will then pass from the exhaust bore 34 through the ports 41 and 18 and will be exhausted by the exhaust pipe 21. As the steam pressure within the space 43 is reduced, the steam pressure within the space 42 will be considerably greater than the steam pressure within the space 43 and therefore the reciprocal head 22 will be driven toward the cap or head 5 of the cylinder 3. As soon as the openings 36 and 38 move out of registry, the steam pressure within the spaces 42 and 43 will again be equalized and the movement of the reciprocal head 22 will cease. At this time, however, the port 10 will be open and the steam may pass from the groove 23 into the chamber 9 and thence through the pipe 19 into the tubular casing 1 for driving the stem 2 in one direction.

When it is desired to cut off the flow of the steam through the port 10, the valve sleeve 35 may be shifted in an opposite direction whereby the steam will be drawn partially through the tube 33. This will cause the exhaust openings 37 to register with the exhaust openings 39 formed in the tube 33 thereby relieving the space between the reciprocal head 22 and the head or cap 4 of the cylinder 3 of a considerable pressure and thus cause the reciprocal head 22 to move to the position it originally assumed, thus cutting off the flow of the steam through the port 10. In order to operate this sleeve 35 there is provided a rod 44 which is adapted to extend to a position where the person operating and attending to the saw and carriage stands. By shifting this rod 44 the lever 45 will be swung away from the supporting block 46 and will thereby shift the link 47. By the shifting of this rod in a desired direction, the link will be shifted and as soon as the link is connected to the solid end portion 48 of the valve sleeve 35 the valve sleeve may be moved in a desired direction. This valve sleeve 35 is also provided with a longitudinal slot 49 in its solid end 48 through which a pin 50 carried by the tube 33 may pass therethrough. This pin is not adapted to engage the solid portion 48 at either end of the slot 49 when the device is in working order but if the reciprocal head 22 in any way becomes inoperative within the cylinder 3 the striking of the pin upon the solid portion 48 will foul the rod 44 and will notify the person operating the device that the device is not operating properly. By referring to Fig. 1 it will also be seen that there is provided a second steam feed-valve referred to in general by the numeral 51. This valve is formed similar in all respects to the device as disclosed at the opposite end of the figure and also in Fig. 2. It is shown inverted in Fig. 1 but the reciprocal valve and valve sleeve operate in the same manner as does the device shown in Fig. 2. Therefore, if the stem 2 has been moved as far as possible in one direction by means of the feed-valve shown in Fig. 2, the rod 44 may shift the link 47 so as to cause the steam feed-valve 51 to pass steam into the opposite end of the casing 1 by means of the pipe 19'. From this construction it will be seen that the stem 2 may be easily shifted in either direction for moving the carriage connected thereto in a desired direction thereby causing the timbers to be conveyed to and from the saw.

From this construction it will be seen that the device may be easily operated without causing a resisting hitch as the reciprocal heads are moved and it will further be seen that the reciprocal heads may be shifted by the same pressure and will not necessitate the manual exertion which would be very awkward and difficult.

From the foregoing description it will be seen that a simple and efficient device has been produced whereby the shifting of a link will control a plurality of valve sleeves which are formed so as to open and close exhaust openings for allowing the reciprocal heads to be shifted by steam pressure for permitting steam to be admitted to either end of a casing which may be of any desired length for shifting or reciprocating a stem carried thereby. It will also be seen that the sleeve 35 may be provided with an aperture 52 for allowing any steam which may happen to be carried within the closed end of the tube 27 to be exhausted into the interior of the sleeve 35.

It is of course obvious that the passages 25 and 26 may be eliminated from the reciprocal head 22 and formed in the cylinder casing 3 for supplying steam to the end portions of the cylinder casing, without departing from the spirit of this invention.

What I claim is:—

1. A device of the class described comprising a cylinder, said cylinder provided with a feed port and with intake and exhaust ports, a head reciprocally mounted within said cylinder, said head provided with means for conveying steam to each end of said cylinder, said head provided also with an integral tube extending from each end thereof and passing through the end portions of said cylinder, said tubes provided with exhaust openings, a sleeve passing through said head and slidably mounted within said tube, said sleeve provided with exhaust openings, a plurality of said openings being adapted to register with a plurality of openings formed in one of said tubes whereby the steam at one end of said head may be exhausted for reducing the steam pressure, whereby said head may be moved in one direction for opening said feed port, said sleeve provided with exhaust passages for allowing the steam carried within said sleeve to be exhausted.

2. A device of the class described comprising a cylinder, said cylinder provided with a feed port and with intake and exhaust ports, a head reciprocally mounted within said cylinder, means for conveying steam to each end of said cylinder, said head provided with an integral tube extending from each end thereof and passing through the end portions of said cylinder, said tubes provided with exhaust openings, a sleeve passing through said head and slidably mounted within said tubes, said sleeve adapted to be moved for opening and closing said openings in said tubes, thereby exhausting steam from either end of said cylinder and allowing the head to shift in a desired direction.

3. A device of the class described comprising a cylinder, said cylinder provided with a feed port and with intake and exhaust ports, a head reciprocally mounted within said cylinder, means for conveying steam to each end of said cylinder, said head provided with an integral tube extending from each end thereof and passing through the end portions of said cylinder, one of said tubes provided with an open outer end, a sleeve passing through said head and slidably mounted within said tubes, said sleeve extending for a distance beyond the open end of said last mentioned tube, means engaging the extending end of said sleeve for shifting the same, said tubes and said sleeve provided with exhaust openings, said sleeve adapted to be moved so as to allow a plurality of said openings to register, whereby steam may be exhausted from either end of said cylinder whereby said head may slide to open or close said feed opening.

4. A device of the class described comprising a cylinder, said cylinder provided with a feed port and with intake and exhaust ports, a head reciprocally mounted within said cylinder, means for conveying steam to each end of said cylinder, said head provided with a central exhaust and bore, integral tubes extending from the ends of said head and projecting through the end portions of said cylinder, a hollow sleeve slidably mounted within said head and tubes, said tubes and sleeve provided with exhaust openings, said sleeve adapted to be moved whereby a plurality of said openings will register thereby allowing steam to be exhausted from one end of said cylinder through said sleeve and into said exhaust bore, whereby said head may be shifted for opening and closing said feed port.

In testimony whereof I hereunto affix my signature in presence of two witnesses.

EDMUND F. ROETTGER.

Witnesses:
C. PACE,
E. J. THOMPSON.